US009599801B2

(12) United States Patent
Nagatoshi

(10) Patent No.: US 9,599,801 B2
(45) Date of Patent: Mar. 21, 2017

(54) PROJECTION ZOOM LENS AND PROJECTION TYPE DISPLAY DEVICE

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/083,557

(22) Filed: Mar. 29, 2016

(65) Prior Publication Data

US 2016/0291300 A1   Oct. 6, 2016

(30) Foreign Application Priority Data

Apr. 1, 2015   (JP) ................................. 2015-074919

(51) Int. Cl.

| G02B 15/177 | (2006.01) |
|---|---|
| G02B 13/16 | (2006.01) |
| G02B 27/00 | (2006.01) |
| G02B 15/20 | (2006.01) |
| G02B 15/167 | (2006.01) |
| G02B 13/04 | (2006.01) |
| G03B 21/14 | (2006.01) |

(52) U.S. Cl.
CPC .......... *G02B 15/177* (2013.01); *G02B 13/04* (2013.01); *G02B 13/16* (2013.01); *G02B 15/167* (2013.01); *G02B 15/20* (2013.01); *G02B 27/0025* (2013.01); *G03B 21/142* (2013.01)

(58) Field of Classification Search
CPC ...... G02B 15/14; G02B 15/15; G02B 15/155; G02B 15/16; G02B 15/177; G02B 15/20; G02B 15/22; G02B 15/24; G02B 13/009

USPC .......................................... 359/676–686, 689
See application file for complete search history.

(56) References Cited

U.S. PATENT DOCUMENTS

| 5,416,639 | A | * | 5/1995 | Yamanashi | .......... G02B 15/177 359/676 |
|---|---|---|---|---|---|
| 2006/0056054 | A1 | * | 3/2006 | Kashiki | ................ G02B 15/177 359/689 |
| 2013/0250160 | A1 | * | 9/2013 | Neil | ....................... G02B 15/14 348/345 |

FOREIGN PATENT DOCUMENTS

| JP | 2001-066501 A | 3/2001 |
|---|---|---|
| JP | 2011-013657 A | 1/2011 |
| JP | 5253604 B2 | 7/2013 |

* cited by examiner

*Primary Examiner* — Darryl J Collins

(74) *Attorney, Agent, or Firm* — Studebaker & Brackett PC

(57) ABSTRACT

A projection zoom lens includes: a first lens group having a negative refractive power provided most toward the magnification side, which is fixed when changing magnification; and at least two movable lens groups that move to change the relative distance therebetween in the direction of an optical axis when changing magnification. The first lens group is constituted by, in order from the magnification side to the reduction side, a front group which is fixed during focusing operations and a rear group having a negative refractive power that moves in the direction of the optical axis during focusing operations. The front group moves in the direction of the optical axis to correct field curvature. Conditional Formula (1) related to the focal length fw of the entire lens system at the wide angle end and the focal length fla of the front group is satisfied.

$$|fw/fla|<0.2 \qquad (1).$$

15 Claims, 11 Drawing Sheets

FIG.5 EXAMPLE 2

FIG.6 EXAMPLE 3

FIG.7
EXAMPLE 1
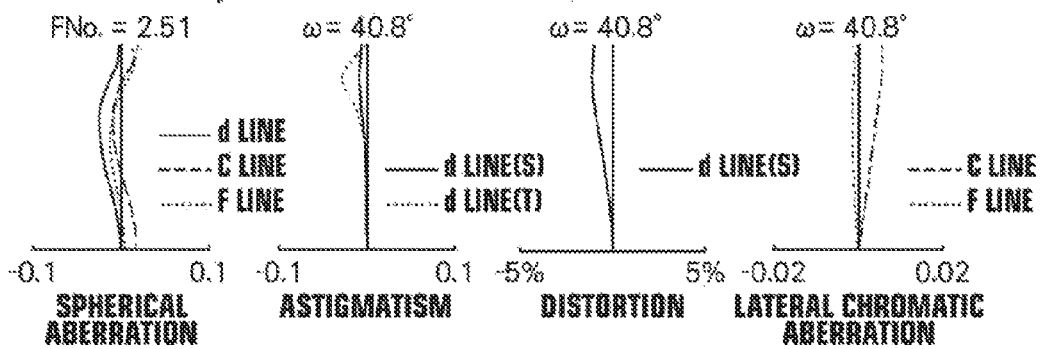
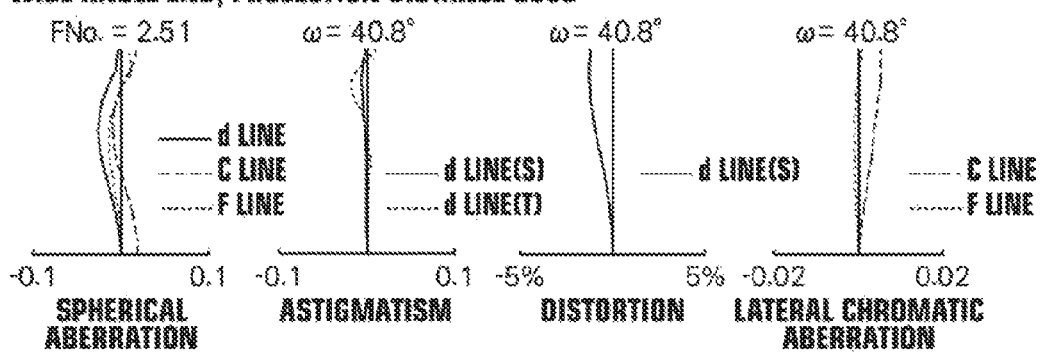
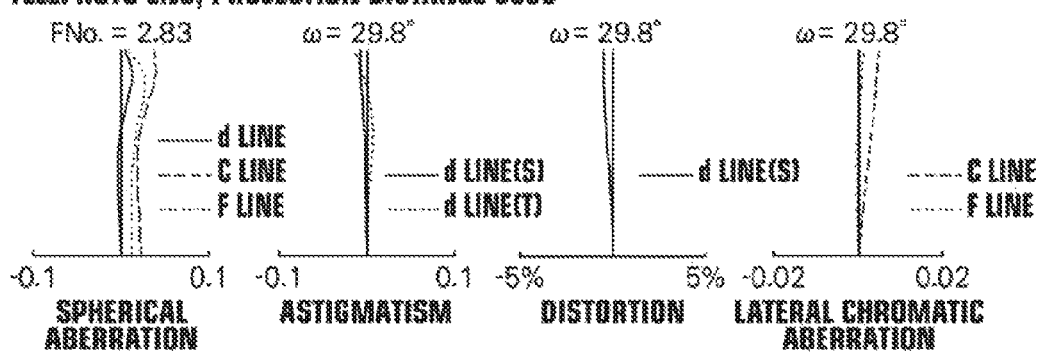
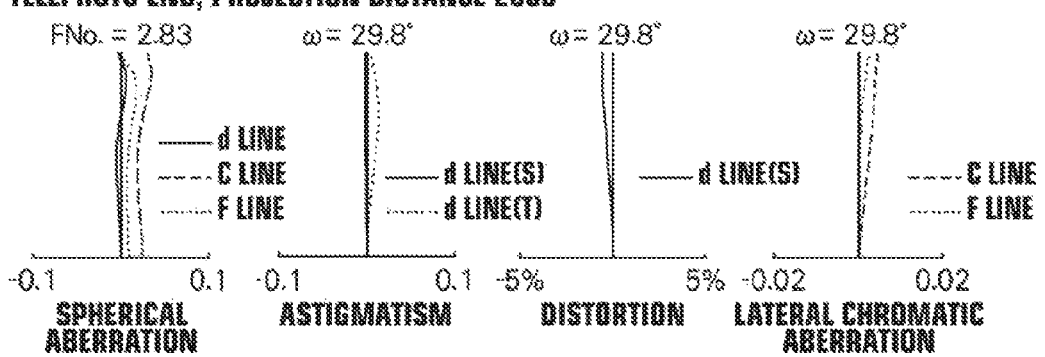

FIG.8
EXAMPLE 2
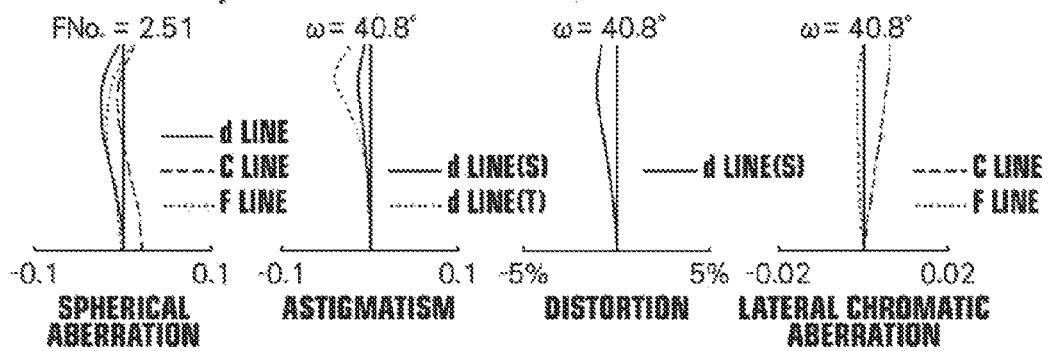
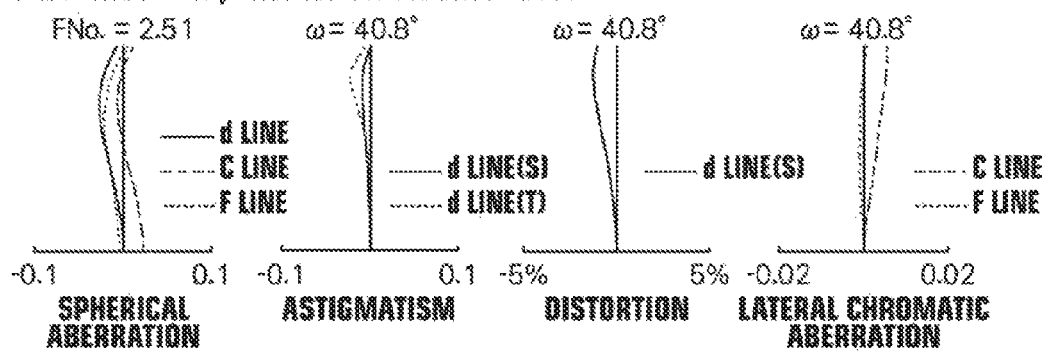
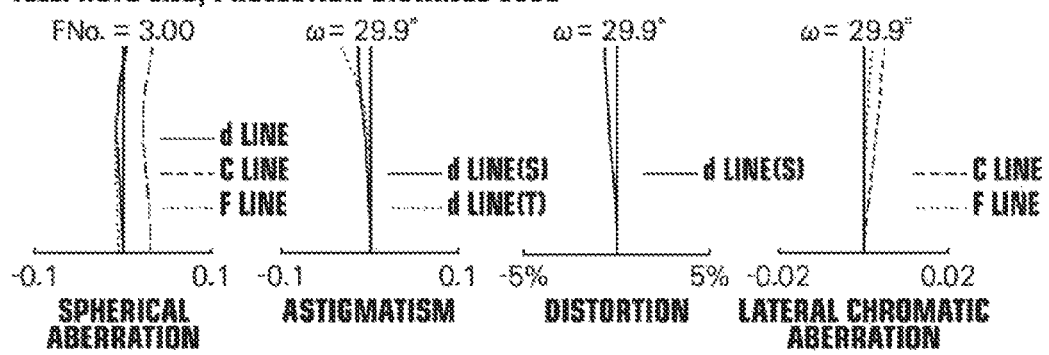
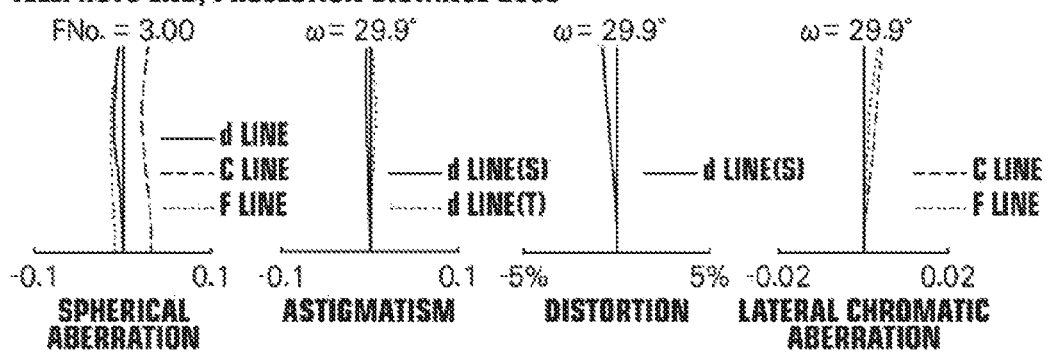

FIG.9
EXAMPLE 3
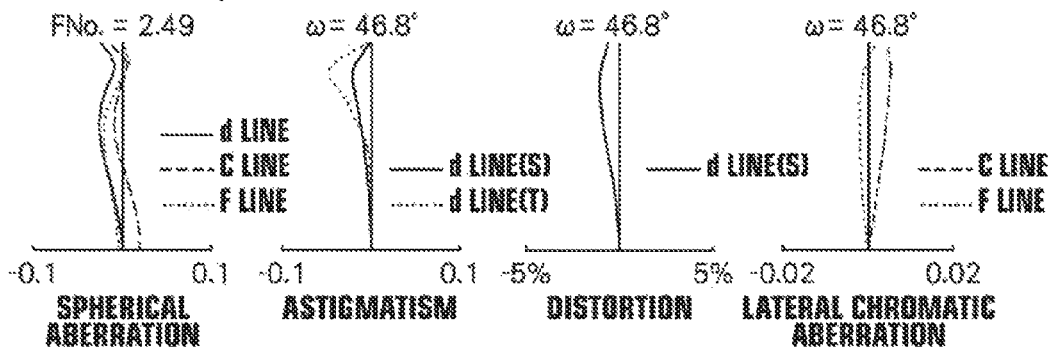
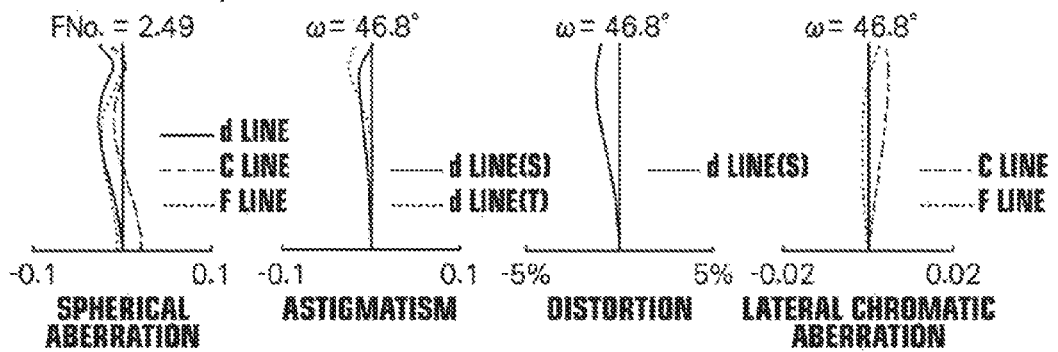
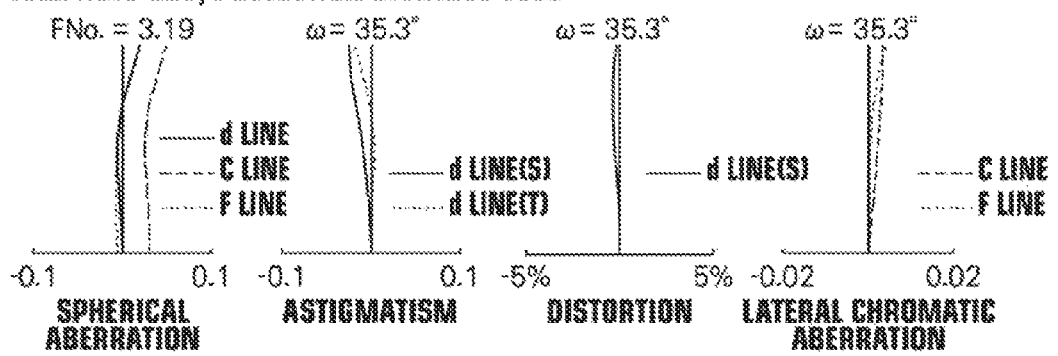
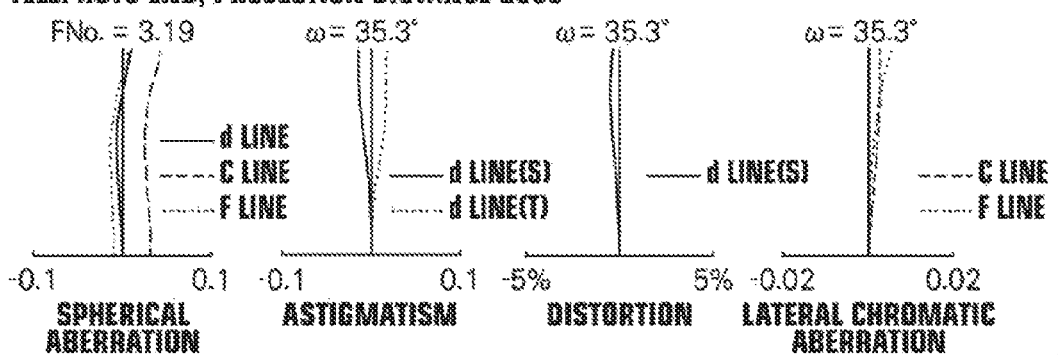

PROJECTION ZOOM LENS AND PROJECTION TYPE DISPLAY DEVICE

CROSS REFERENCE TO RELATED APPLICATIONS

The present application claims priority under 35 U.S.C. §119 to Japanese Patent Application No. 2015-074919 filed on Apr. 1, 2015. The above application is hereby expressly incorporated by reference, in its entirety, into the present application.

BACKGROUND

The present disclosure is related to a projection zoom lens and a projection type display device. The present disclosure is related to a projection zoom lens which is suited to magnify and project original images which are formed by light valves onto a screen, for example, and a projection type display device equipped with such a projection zoom lens.

Conventionally, projection type display devices that utilize light valves, such as liquid crystal display elements, DMD's (Digital Micromirror Devices: registered trademark), etc., are in wide use. Particularly, projection type display devices of configurations that employ three light valves, each corresponding to illuminating light beams of the three primary colors, R (red), G (green), and B (blue), combine light beams which are modulated by each of the light valves with a prism or the like, and display images on screens via a projection lens, are in wide use.

It is necessary for projection lenses which are utilized in projection type display devices to have a focusing function, because the distance from the projection type display devices to screens and screen sizes vary according to installation environments. The inner focus method, in which a lens most toward the magnification side does not move, is known as a focusing method that is employed in projection lenses. In addition, there is a tendency for zoom lens systems having a magnification changing function to be preferred as projection lenses, so as to be capable of adjusting the sizes of projected images according to screen sizes in various installation environments. Japanese Unexamined Patent Publication No. 2001-066501, Japanese Patent No. 5253604, and Japanese Unexamined Patent Publication No. 2011-013657, for example, disclose conventionally known zoom lenses that employ the inner focus method.

Japanese Unexamined Patent Publication No. 2001-066501 discloses a zoom lens, in which a first lens group provided most toward the object side is constituted by a first lens group front group having a positive refractive power and a first lens group rear group having a negative refractive power, and only the first lens group rear group moves during focusing operations. Japanese Patent No. 5253604 discloses a zoom lens, in which a first lens unit provided most toward the magnification side is constituted by, in order from the magnification side to the reduction side, a 1A lens sub unit having a negative optical power and a 1B lens sub unit having a positive optical power, and the 1A lens sub unit is fixed while the 1B lens sub unit moves during focusing operations. Japanese Unexamined Patent Publication No. 2011-013657 discloses a projection zoom lens, in which a second lens group, which is a lens group provided second from the magnification side, moves during focusing operations.

SUMMARY

Recently, cases in which projection type display devices are employed to project images onto large screens in halls and exhibitions are increasing. In addition, there are often cases in which large projection screen sizes are required with short projection distances. For these reasons, there is demand for projection lenses to have wider angles of view. In addition, in configurations in which a color combining optical system that combines light modulated by a plurality of light valves and a light beam separating optical system that separates illuminating light and projected light are provided between a lens system and the light valves, a long back focus is required for the projection lens. Projection lenses of the retro focus type are often employed in order to meet these demands The lens system disclosed in Japanese Unexamined Patent Publication No. 2001-066501 is of the retro focus type. However, the angle of view thereof is small, and the back focus thereof is short. The lens system disclosed in Japanese Patent No. 5253604 has an insufficient angle of view and a short back focus. A further widening of the angle of view is required in the lens system disclosed in Japanese Unexamined Patent Publication No. 2011-013657 in order to satisfy recent demand.

Further, in the case that production errors occur when producing projection zoom lenses, field curvature may change from that which was presumed during the design process thereof. Correction of field curvature in such cases is desired. In addition, in the case that an amount of flange back error that cannot be ignored is present when a projection zoom lens is mounted in a projection type display device, the conjugate position will shift from that which was presumed during the design process thereof. Therefore, a focusing group may be moved to perform adjustments. However, there is a tendency for field curvature to change when such adjustments are performed, and correction of the changed field curvature is desired. The above changes in field curvature appear more prominently as the angle of view of a lens system becomes wider. Therefore, correction of field curvature is strongly desired particularly in lens systems having wide angles of view.

The present disclosure has been developed in view of the foregoing circumstances. The present disclosure provides a projection zoom lens having a wide angle of view, a long back focus, is capable of correcting field curvature, and has high optical performance. In addition, the present disclosure provides a projection type display device equipped with such a projection zoom lens.

A projection zoom lens of the present disclosure comprises:

a first lens group having a negative refractive power provided most toward the magnification side, which is fixed when changing magnification; and at least two movable lens groups that move to change the relative distance therebetween in the direction of an optical axis when changing magnification;

the first lens group consisting of, in order from the magnification side to the reduction side, a front group which is fixed during focusing operations and a rear group having a negative refractive power that moves in the direction of the optical axis during focusing operations;

the front group moving in the direction of the optical axis to correct field curvature; and Conditional Formula (1) below being satisfied:

$$|fw/fla|<0.2 \qquad (1)$$

wherein fw is the focal length of the entire lens system at the wide angle end; and fla is the focal length of the front group.

In the projection zoom lens of the present disclosure, it is preferable for Conditional Formula (1-1) below to be satisfied.

$$|fw/fla|<0.15 \quad (1\text{-}1)$$

In the projection zoom lens of the present disclosure, it is preferable for Conditional Formula (2) below to be satisfied, and more preferable for Conditional Formula (2-1) below to be satisfied.

$$1.5<hla/hlb \quad (2)$$

$$2.0<hla/hlb<4.0 \quad (2\text{-}1)$$

wherein hla is the maximum height of a principal light ray at a maximum angle of view at the wide angle end in the front group in the case that the reduction side pupil position is infinity, and hlb is the maximum height of a principal light ray at a maximum angle of view at the wide angle end in the rear group in the case that the reduction side pupil position is infinity.

In the projection zoom lens of the present disclosure, it is preferable for the lens surface most toward the reduction side within the rear group to be a concave surface.

In the projection zoom lens of the present disclosure, it is preferable for a final lens group having a positive refractive power, which is fixed when changing magnification, to be provided most toward the reduction side.

In the projection zoom lens of the present disclosure, it is preferable for the lens provided most toward the reduction side in the rear group to be a negative lens, and for the lens provided second from the reduction side in the rear group to be a positive lens.

In the projection zoom lens of the present disclosure, it is preferable for the front group to include a cemented lens formed by cementing a negative lens and a positive lens together, for the refractive index with respect to the d line of the negative lens that constitutes the cemented lens to be greater than the refractive index with respect to the d line of the positive lens that constitutes the cemented lens by at least 0.1, and for Conditional Formulae (3) and (4) below to be satisfied.

$$Ndn<-0.01\cdot vdn+2.1 \quad (3)$$

$$Ndp<-0.01\cdot vdp+2.1 \quad (4)$$

wherein Ndn is the refractive index with respect to the d line of the negative lens that constitutes the cemented lens within the front group, vdn is the Abbe's number with respect to the d line of the negative lens that constitutes the cemented lens within the front group, Ndp is the refractive index with respect to the d line of the positive lens that constitutes the cemented lens within the front group, and vdp is the Abbe's number with respect to the d line of the positive lens that constitutes the cemented lens within the front group.

In the projection zoom lens of the present disclosure, it is preferable for Conditional Formula (5) below to be satisfied, and more preferable for Conditional Formula (5-1) below to be satisfied.

$$flb/fla<0.8 \quad (5)$$

$$0.0\leq flb/fla<0.6 \quad (5\text{-}1)$$

wherein fla is the focal length of the front group, and flb is the focal length of the rear group.

The projection zoom lens of the present disclosure may be configured to consist of, in order from the magnification side to the reduction side: the first lens group; three movable lens groups that move to change the relative distances thereamong when changing magnification, and a final lens group having a positive refractive power which is fixed when changing magnification. Alternatively, the projection zoom lens of the present disclosure may be configured to consist of, in order from the magnification side to the reduction side: the first lens group; four movable lens groups that move to change the relative distances thereamong when changing magnification, and a final lens group having a positive refractive power which is fixed when changing magnification.

In the projection zoom lens of the present disclosure, it is preferable for Conditional Formula (6) below to be satisfied, and more preferable for Conditional Formula (6-1) below to be satisfied.

$$2.5<Bf/fw \quad (6)$$

$$3.5<Bf/fw<10.0 \quad (6\text{-}1)$$

wherein Bf is an air converted distance along the optical axis from the lens surface most toward the reduction side to a reduction side conjugate plane, and fw is the focal length of the entire lens system at the wide angle end.

A projection type display device of the present disclosure comprises:

a light source;

a light valve into which light from the light source enters; and a projection zoom lens of the present disclosure described above as a projection zoom lens that projects an optical image formed by light, which is optically modulated by the light valve, onto a screen.

Note that the "magnification side" refers to the side toward which images are projected (toward a screen), and the side toward the screen will be referred to as the magnification side even when reduced projection is performed for the sake of convenience. Meanwhile, the "reduction side" refers to the side toward an original image display region (toward the light valves), and the side toward the light valves will be referred to as the magnification side even when reduced projection is performed for the sake of convenience.

Note that fw in the conditional formulae above is that for a case in which the projection distance is infinity. In addition, Bf in the conditional formulae above is that at the wide angle end.

Note that the phrases "consists of . . . " and "consist of . . . " above refer to essential elements, and mean that the projection zoom lens may include other constituted elements other than those listed above, such as lenses that substantially do not have any power, optical elements other than lenses such as a stop and a cover glass.

Note that the phrases "lens group", "front group", and "rear group" above do not necessarily refer to those constituted by a plurality of lenses, and may include those which are constituted by a single lens.

Note that the signs of the refractive powers of the above lens groups, the signs of the refractive powers of the lenses, and the shapes of the lenses will be considered in the paraxial region for lenses that include aspherical surfaces, unless particularly noted otherwise.

Note that the expression "back focus" in the present specification refers to that in the case that the reduction side is designated as the back side.

According to the present disclosure, the negative first lens group, which is fixed when changing magnification, is provided most toward the magnification side, and a plurality of movable lens groups that move when changing magnification are provided at the reduction side of the first lens group, in a zoom lens system that employs the inner focus method. In this zoom lens system, the first lens group is constituted by, in order from the magnification side to the reduction side, a front group which is fixed during focusing operations and a rear group that moves in the direction of an optical axis during focusing operations. The front group moves in the direction of the optical axis to correct field curvature, and Conditional Formula (1) is satisfied. Therefore, a projection zoom lens having a wide angle of view, a long back focus, is capable of correcting field curvature, and has high optical performance, as well as a projection type display device equipped with this projection zoom lens, can be provided.

BRIEF DESCRIPTION OF THE DRAWINGS

FIG. 7 is a collection of diagrams that illustrate various aberrations of the projection zoom lens of Example 1, wherein the diagrams are those that illustrate spherical aberration, astigmatism, distortion, and lateral chromatic aberration in order from the left side to the right side of the drawing sheet.

FIG. 8 is a collection of diagrams that illustrate various aberrations of the projection zoom lens of Example 2, wherein the diagrams are those that illustrate spherical aberration, astigmatism, distortion, and lateral chromatic aberration in order from the left side to the right side of the drawing sheet.

FIG. 9 is a collection of diagrams that illustrate various aberrations of the projection zoom lens of Example 3, wherein the diagrams are those that illustrate spherical aberration, astigmatism, distortion, and lateral chromatic aberration in order from the left side to the right side of the drawing sheet.

DESCRIPTION OF THE PREFERRED EMBODIMENTS

Figure 1:
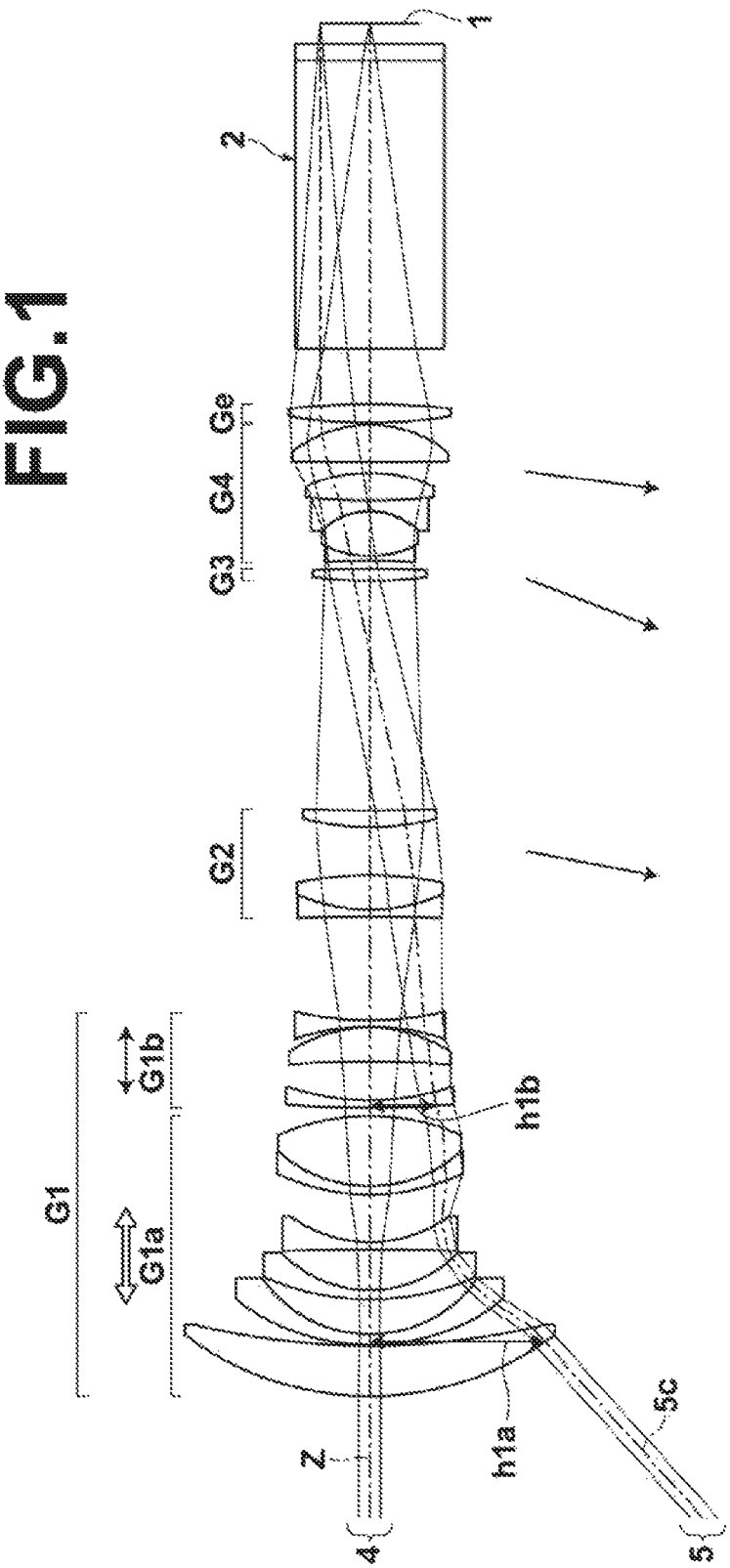
FIG. 1 is a sectional diagram that illustrates the lens configuration of and the trajectories of light beams through a projection zoom lens according to an embodiment of the present disclosure.

Hereinafter, embodiments of the present disclosure will be described in detail with reference to the accompanying drawings. FIG. 1 is a sectional diagram that illustrates the lens configuration of and the optical paths of an axial light beam 4 and a light beam 5 at a maximum angle of view through a projection zoom lens according to an embodiment of the present disclosure, which corresponds to a projection zoom lens according to Example 1 to be described later, at the wide angle end. In FIG. 1, the left side of the drawing sheet is the magnification side, and the right side of the drawing sheet is the reduction side.

This projection zoom lens is capable of being utilized as a projection zoom lens which is mounted on a projection type display device, for example, and projects image information displayed on a light valve onto a screen. Presuming a case in which the projection zoom lens is mounted on a projection type display device, an optical member 2, which functions as a prism, various filters, a cover glass, etc., and an image display surface 1 of a light valve, positioned toward the reduction side of the optical member 2, are also illustrated in FIG. 1. In the projection type display device, light beams, to which the image information is imparted by the image display surface 1, enter the projection zoom lens via the optical member 2. The projection zoom lens projects the beams onto a screen (not shown) disposed toward the left side direction of the drawing sheet.

Note that FIG. 1 illustrates only one image display surface 1. However, the projection type display device may be configured to separate beams from a light source into three primary colors with a color separating optical system. In this case, three light valves that respectively correspond to the three primary colors may be provided, to enable display of full color images.

This projection zoom lens is equipped with a first lens group G1 having a negative refractive power, which is provided most toward the magnification side and is fixed when changing magnification, and at least two movable lens groups which are provided more toward the reduction side than the first lens group G1 and move to change the relative distances therebetween in the direction of the optical axis when changing magnification. Configuring the first lens group G1, which is provided at the most magnification side, to be a negative lens group is advantageous from the viewpoint of obtaining a wide angle of view.

For example, the projection zoom lens illustrated in FIG. 1 is constituted by, arranged in order along the direction of the optical axis from the magnification side to the reduction side, five lens groups, which are the first lens group G1, a second lens group G2, a third lens group G3, a fourth lens group G4, and a final lens group Ge. Among these lens groups, the second lens group G2, the third lens group G3, and the fourth lens group G4 move to change the distances among adjacent lens groups when changing magnification from the wide angle end to the telephoto end, and these three lens groups correspond to the movable lens groups. In FIG. 1, arrows that schematically indicate the directions of movement of each movable lens group when changing magnification from the wide angle end to the telephoto end are illustrated beneath each of the movable lens groups. In the example illustrated in FIG. 1, all of the second lens group G2, the third lens group G3, and the fourth lens group G4 move toward the magnification side without reversing the direction of movement when changing magnification from the wide angle end to the telephoto end.

The first lens group G1 is constituted by, in order from the magnification side to the reduction side, a front group G1a and a rear group G1b having a negative refractive power.

Securing the negative refractive power of the first lens group G1 is facilitated by configuring the rear group G1b to be a negative lens group.

Note that it is preferable for the lens surface most toward the reduction side within the rear group G1b to be a concave surface. In this case, light rays can become divergent at the lens surface most toward the reduction side within the first lens group G1, and astigmatism can be favorably corrected while securing a necessary amount of back focus.

In addition, it is preferable for the lens most toward the reduction side within the rear group G1b to be a negative lens, and for the second lens from the reduction side within the rear group G1b to be a positive lens. Such a configuration is effective in correcting astigmatism.

In this projection zoom lens, the front group G1a is fixed and only the rear group G1b moves in the direction of the optical axis during focusing operations. The horizontal arrows illustrated in black solid lines above the rear group G1b in FIG. 1 indicate that the rear group G1b is a focusing lens group. By adopting the inner focus method in this manner, it will not be necessary to drive lenses toward the magnification side which have large diameters and heavy weights during focusing operations. As a result, the load on a driving mechanism can be decreased, and the total length of the lens system can be maintained constant during focusing operations.

In addition, this projection zoom lens is configured to correct field curvature by moving the front group G1a in the direction of the optical axis. The outlined horizontal arrows illustrated above the front group G1a in FIG. 1 indicate that the front group G1a is a correcting group that corrects field curvature. Further, this projection zoom lens is configured such that Conditional Formula (1) below is satisfied.

$$|fw/fla| < 0.2 \quad (1)$$

wherein fw is the focal length of the entire lens system at the wide angle end; and fla is the focal length of the front group.

Field curvature can be corrected by movement of the front group G1a. Therefore, field curvature can be corrected by a simple method, which is effective in cases that changes in field curvature occur, which was described as a problem to be solved by the invention. Note that the movement of the front group G1a in order to correct field curvature is not limited to continuous movement, and may be stepwise movement. For example, movement of the front group G1a may be performed by interposing adjusting plates between the front group G1a and a component at the reduction side or the magnification side thereof during assembly adjustments.

In addition, to the aforementioned function of the front group G1a, by suppressing the refractive power of the front group G1a such that the value of |fw/fla| is not greater than or equal to the upper limit defined in Conditional Formula (1), field curvature can be corrected with very little change in the back focus even when the front group G1a is moved in the direction of the optical axis, causing the front group G1a to be favorably suitable for use as a correcting group. Assuming that the back focus changes to a degree that cannot be ignored when the front group G1a is moved in the direction of the optical axis in order to correct field curvature, it will become necessary to adjust the back focus at other locations, resulting in adjustment operations becoming extremely complex.

It is preferable for Conditional Formula (1-1) below to be satisfied, in order to cause the advantageous effect related to Conditional Formula (1) to become more prominent.

$$|fw/fla| < 0.15 \quad (1\text{-}1)$$

Figure 2:
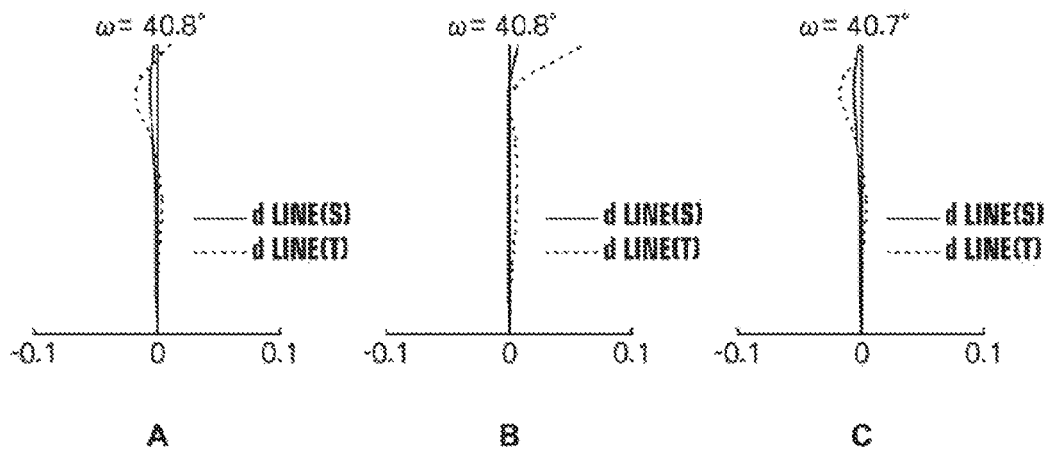
FIG. 2 is a collection of aberration diagrams for explaining changes in and correction of field curvature at the wide angle end.

Changes in field curvature and examples of correction thereof in the example of the configuration illustrated in FIG. 1 are shown as aberration diagrams for field curvature in A through C of FIG. 2. In each of the aberration diagrams of A through C of FIG. 2, the vertical axis represents half angles of view ω, and the horizontal axis represents amounts of aberration. Aberrations in the sagittal direction and the tangential direction related to the d line (wavelength: 587.6 nm) are respectively shown as solid lines and short broken lines.

A of FIG. 2 illustrates field curvature in the case that there are no errors, such as flange back error or production errors. B of FIG. 2 illustrates field curvature after that the rear group G1b, which is the focusing group, is moved to adjust for a case in which a flange back error of 0.05 is in a direction that the length thereof increases. If B of FIG. 2 and A of FIG. 2 are compared, the field curvature is changed, and it can be understood that the change is particularly significant at a region of higher angles of view. C of FIG. 2 illustrates field curvature after the front group G1a, which is the correcting group, is moved 0.14 toward the reduction side from the state illustrated in B of FIG. 2. The field curvature illustrated in C of FIG. 2 is substantially the same as that illustrated in A of FIG. 2, and it can be understood that the changed field curvature was favorably corrected by movement of the front group G1a.

Figure 3:
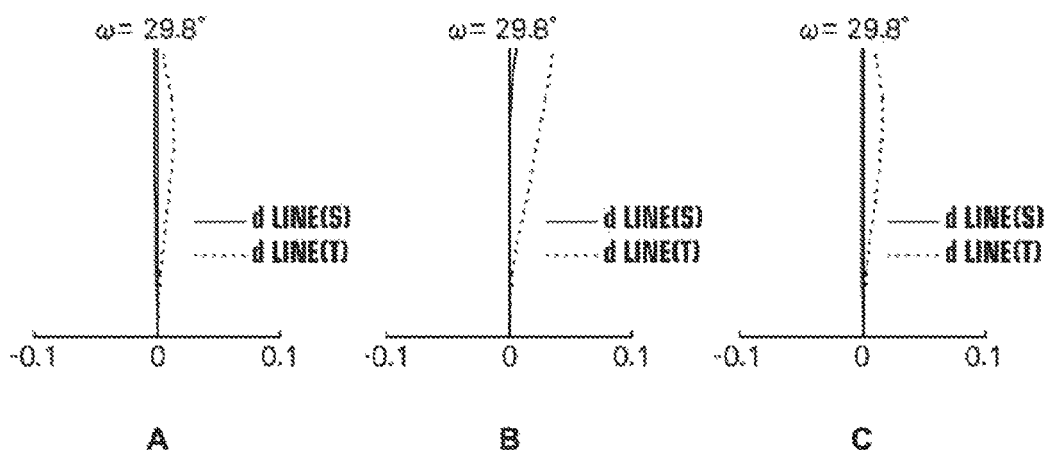
FIG. 3 is a collection of aberration diagrams for explaining changes in and correction of field curvature at the telephoto end.

Note that the aberration diagrams of A through C of FIG. 2 are those for the wide angle end in the case that the projection distance is 2000. A through C of FIG. 3 illustrate field curvature for cases which are the same as A through C of FIG. 2, except that the magnification state is the telephoto end. From A through C of FIG. 2 and A through C of FIG. 3, it can be understood that field curvature is favorably corrected at both the wide angle end and the telephoto end. Note that the numerical values of the aforementioned flange back error and the amount of movement of the front group G1a are based on the lens data of Example 1, to be described later.

Note that the front group G1a may be a lens group having a positive refractive power, or a lens group having a negative refractive power. In the case that the front group G1a is a negative lens group, the two lens groups that constitute the first lens group G1 will both be negative lens groups, which is advantageous from the viewpoints of widening the angle of view and securing a long back focus.

It is preferable for the front group G1a to include a cemented lens formed by cementing a negative lens and a positive lens together, for the refractive index with respect to the d line of the negative lens that constitutes the cemented lens to be greater than the refractive index with respect to the d line of the positive lens that constitutes the cemented lens by at least 0.1, and for Conditional Formulae (3) and (4) below to be satisfied.

$$Ndn < -0.01 \cdot vdn + 2.1 \quad (3)$$

$$Ndp < -0.01 \cdot vdp + 2.1 \quad (4)$$

wherein Ndn is the refractive index with respect to the d line of the negative lens that constitutes the cemented lens within the front group, vdn is the Abbe's number with respect to the d line of the negative lens that constitutes the cemented lens within the front group, Ndp is the refractive index with respect to the d line of the positive lens that constitutes the cemented lens within the front group, and vdp is the Abbe's number with respect to the d line of the positive lens that constitutes the cemented lens within the front group.

Note that in the case that the cemented lens includes a plurality of negative lenses, it is only necessary for at least one of the negative lenses to have the preferred configuration above. Similarly, in the case that the cemented lens includes a plurality of positive lenses, it is only necessary for at least one of the positive lenses to have the preferred configuration above. In addition, in the case that the front group G1a includes a plurality of cemented lenses it is only necessary for at least one of the cemented lenses to have the preferred configuration above.

By configuring the cemented lens included in the front group G1a such that the refractive index with respect to the d line of the negative lens that constitutes the cemented lens to be greater than the refractive index with respect to the d line of the positive lens that constitutes the cemented lens by at least 0.1, field curvature and astigmatism can be favorably corrected. In addition, by selecting the materials of the lenses within the cemented lens such that Conditional Formulae (3) and (4) are satisfied, field curvature and lateral chromatic aberration can be favorably corrected. A cemented lens that satisfies Conditional Formulae (3) and (4) may be formed by cementing a negative meniscus lens with a concave surface toward the reduction side and a biconvex lens, provided in this order from the magnification side to the reduction side, together, for example.

Specifically, for example, the front group G1a may be constituted by, in order from the magnification side to the reduction side, a positive lens with a convex surface toward the magnification side, three negative lenses with concave surfaces toward the reduction side, and a cemented lens formed by cementing a negative lens and a positive lens together. Alternatively, the front group G1a may be constituted by, in order from the magnification side to the reduction side, a positive lens with a convex surface toward the magnification side, three negative lenses with concave surfaces toward the reduction side, a cemented lens formed by cementing a negative lens and a positive lens together, a negative meniscus lens, and a positive meniscus lens.

In this projection zoom lens, it is preferable for Conditional Formula (2) below to be satisfied.

$$1.5 < hla/hlb \tag{2}$$

wherein hla is the maximum height of a principal light ray at a maximum angle of view at the wide angle end in the front group in the case that the reduction side pupil position is infinity, and hlb is the maximum height of a principal light ray at a maximum angle of view at the wide angle end in the rear group in the case that the reduction side pupil position is infinity.

Conditional Formula (2) sets a preferable range for the ratio between the maximum height in the front group G1a and the maximum height in the rear group G1b of a principal light ray 5c at a maximum angle of view in the case that a reduction side pupil position is at infinity. FIG. 1 illustrates examples of hla and hlb. By configuring the projection zoom lens such that the value of hla/hlb is not less than or equal to the lower limit defined in Conditional Formula (2), suppressing distortion and field curvature in a lens system having a wide angle of view is facilitated.

It is more preferable for the projection zoom lens to be configured such that the value of hla/hlb is not less than or equal to the lower limit defined in Conditional Formula (2-1), in order to cause the above advantageous effect related to Conditional Formula (2) to become more prominent. In addition, by configuring the projection zoom lens such that the value of hla/hlb is not greater than or equal to the upper limit defined in Conditional Formula (2-1), the diameter of the lens provided most toward the magnification side can be suppressed, and an increase in the size of the lens system can be suppressed.

$$2.0 < hla/hlb < 4.0 \tag{2-1}$$

In addition, in this projection zoom lens, it is preferable for Conditional Formula (5) below to be satisfied.

$$flb/fla < 0.8 \tag{5}$$

wherein fla is the focal length of the front group, and flb is the focal length of the rear group.

By configuring the projection zoom lens such that the value of flb/fla is not greater than or equal to the upper limit defined in Conditional Formula (5), the refractive power of the rear group G1b can be secured, and the amount of movement of the rear group G1b during focusing operations becoming excessively great can be prevented. Therefore, fluctuations in performance when the projection distance changes can be decreased, and maintaining favorable performance is facilitated. It is more preferable for the projection zoom lens to be configured such that the value of flb/fla is not greater than or equal to the upper limit defined in Conditional Formula (5-1), in order to cause the above advantageous effect related to Conditional Formula (5) to become more prominent. In addition, configuring the projection zoom lens such that the value of flb/fla is not less than or equal to the lower limit defined in Conditional Formula (5-1) is advantageous from the viewpoints of widening the angle of view and securing a long back focus.

$$0.0 < flb/fla < 0.6 \tag{5-1}$$

In addition, in this projection zoom lens, it is preferable for Conditional Formula (6) below to be satisfied.

$$2.5 < Bf/fw \tag{6}$$

wherein Bf is an air converted distance along the optical axis from the lens surface most toward the reduction side to a reduction side conjugate plane, and fw is the focal length of the entire lens system at the wide angle end.

Bf in Conditional Formula (6) is back focus as an air converted distance. Conditional Formula (6) is related to a preferable range of the back focus ratio Bf/fw. By configuring the projection zoom lens such that the value of Bf/fw is not less than or equal to the lower limit defined in Conditional Formula (6), a back focus of an appropriate length can be secured. It is more preferable for the projection zoom lens to be configured such that the value of Bf/fw is not less than or equal to the lower limit defined in Conditional Formula (6-1), in order to cause the above advantageous effect related to Conditional Formula (6) to become more prominent. In addition, by configuring the projection zoom lens such that the value of Bf/fw is not greater than or equal to the upper limit defined in Conditional Formula (6-1), the total length of the entire lens system can be suppressed, and an increase in the size of the lens system can be suppressed.

$$3.5 < Bf/fw < 10.0 \tag{6-1}$$

In addition, it is preferable for this projection zoom lens to have favorably telecentric properties at the reduction side, as illustrated in FIG. 1. Note that the expression "favorable telecentric properties at the reduction side" means that the inclination of an angular line that bisects the cross section of a light beam focused at an arbitrary point on the reduction side conjugate plane between the maximum ray of light at the upper side and the maximum ray of light at the lower side thereof with respect to the optical axis is within a range from −3° to +3°. By configuring the lens system to be that having favorable telecentric properties at the reduction side, deterioration in performance caused by incident angle dependency can be prevented, even in the case that an optical member having incident angle dependency such as a prism is provided between the lens system and light valves.

In addition, it is preferable for the final lens group Ge provided at the most reduction side within this projection zoom lens to be fixed when changing magnification, and to be a lens group having a positive refractive power. Configuring the first lens group G1 to be a negative lens group and the final lens group Ge to be a positive lens group is advantageous from the viewpoints of widening the angle of view and realizing a long back focus. Further, by configuring the final lens group Ge to be a fixed lens group which is fixed when changing magnification, maintaining telecentric properties at the reduction side even when magnification changes is facilitated.

The example illustrated in FIG. 1 is constituted by, in order from the magnification side to the reduction side, the first lens group G1, three movable lens groups that move to change the relative distances thereamong when changing magnification, and the final lens group Ge having a positive refractive power which is fixed when changing magnification. However, the number of lens groups that constitute the projection zoom lens of the present disclosure is not limited to the example illustrated in FIG. 1. It is possible for the projection zoom lens of the present disclosure to be constituted by, in order from the magnification side to the reduction side, the first lens group G1, four movable lens groups that move to change the relative distances thereamong when changing magnification, and the final lens group Ge having a positive refractive power which is fixed when changing magnification.

In addition, in the projection zoom lens which is the objective of the present disclosure, it is preferable for distortion to be suppressed to be within a range from −2% to +2% throughout the entire zoom range. In addition, it in the projection zoom lens which is the objective of the present disclosure, it is preferable for the F number to be 3.0 or less throughout the entire zoom range.

Note that it is possible to adopt arbitrary combinations of the preferable configurations and the possible configurations described above. It is preferable for the configurations described above to be selectively adopted as appropriate, according to items desired of the projection zoom lens. By adopting the preferable configurations as appropriate, more favorable optical properties and an optical system capable of being compatible with higher specifications can be realized. The projection zoom lens according to the embodiment of the present disclosure may be applied to a lens system having a wide angle of view and a long back focus. Note that here, the lens system having a wide angle of view is that having a maximum angle of view of 75° or greater at the wide angle end in the case that the projection distance is infinity.

Next, specific examples of the projection zoom lens of the present disclosure will be described. Note that the numerical value data of the examples to be indicated hereinbelow are those which are normalized such that the focal length of the entire lens system at the wide angle end when the projection distance is infinity will be 10.0.

Example 1

Figure 4:
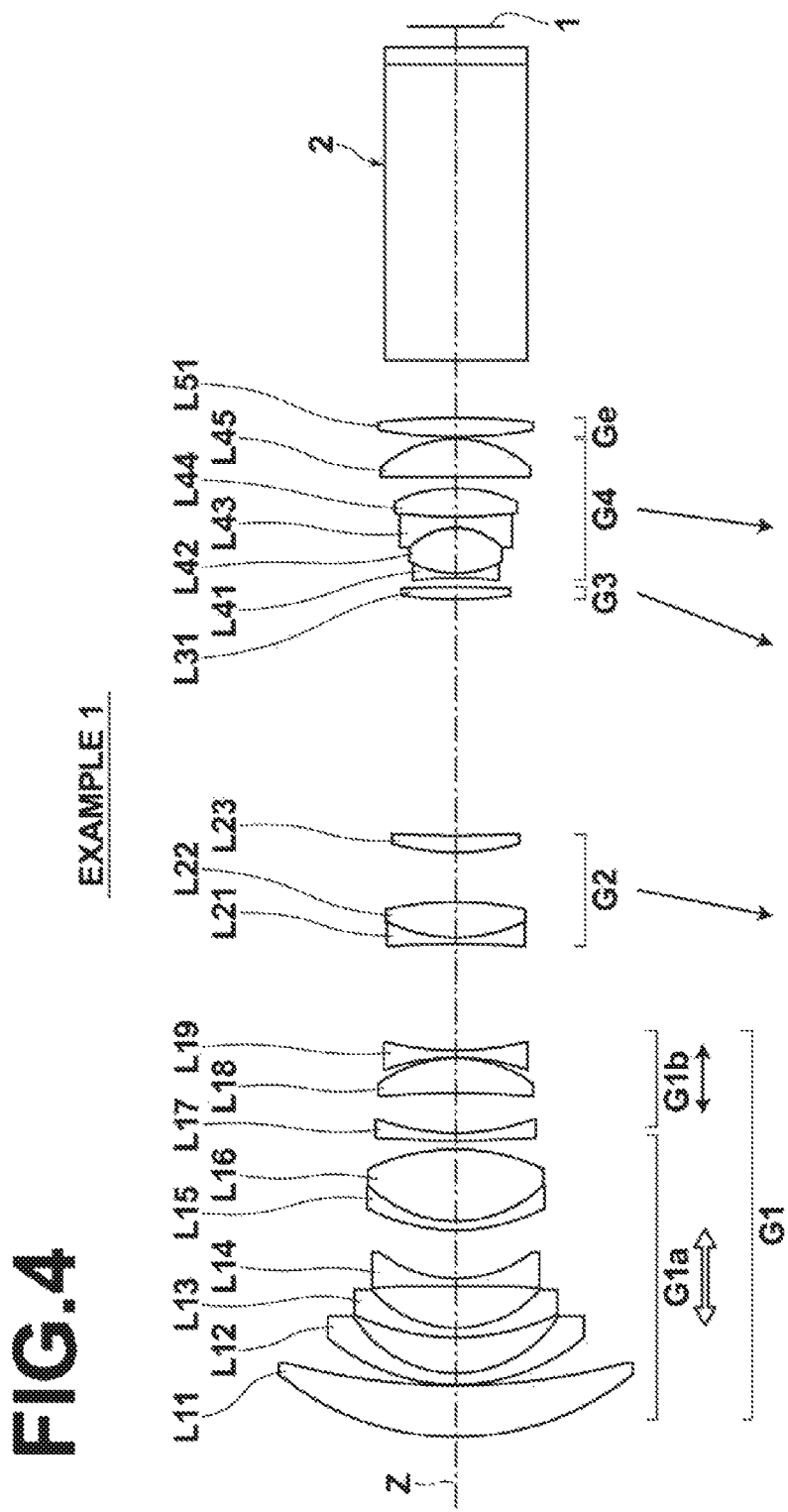
FIG. 4 is a sectional diagram that illustrates the lens configuration of a projection zoom lens according to Example 1 of the present disclosure.

FIG. 4 is a sectional diagram that illustrates the lens configuration of a projection zoom lens of Example 1. In FIG. 4, the left side is the magnification side, and the right side is the reduction side. The projection zoom lens of Example 1 is constituted by five lens groups, which are the first lens group G1 through a fourth lens group G4, the distances among adjacent lens groups therein changing when changing magnification from the wide angle end to the telephoto end, and the final lens group Ge. Only a second lens group G2 through the fourth lens group G4 move while the first lens group G1 and the final lens group Ge are fixed, when changing magnification. The arrows which are illustrated in FIG. 4 are equivalent to those illustrated in FIG. 1.

The first lens group G1 is constituted by, in order from the magnification side to the reduction side, the front group G1a having a negative refractive power, and a rear group G1b having a negative refractive power. Only the rear group G1b moves during focusing operations. The projection zoom lens of Example 1 is configured such that field curvature is corrected by moving the front group G1a in the direction of the optical axis. The front group G1a is constituted by, in order from the magnification side to the reduction side, a positive lens L11 with a convex surface toward the magnification side, three negative lenses L12 through L14 with concave surfaces toward the reduction side, a negative meniscus lens L15 with a concave surface toward the reduction side, and a biconvex lens L16. The lens L15 and the lens L16 are cemented together to form a cemented lens having a positive refractive power as a whole. The rear group G1b is constituted by, from the magnification side to the reduction side, a negative meniscus lens L17 with a concave surface toward the reduction side, a positive meniscus lens L18 with a convex surface toward the reduction side, and a biconcave lens L19. All of the lenses that constitute the rear group G1b are single lenses.

The second lens group G2 is constituted by, from the magnification side to the reduction side, a cemented lens formed by a negative lens L21 and a positive lens L22 which are cemented together, and a positive lens L23. The third lens group G3 is constituted only by a positive lens L31 with a convex surface toward the magnification side. The fourth lens group G4 is constituted by, in order from the magnification side to the reduction side, five lenses, which are lenses L41 through L45. The final lens group Ge is constituted only by a biconvex lens L51.

Basic lens data of the projection zoom lens of Example 1 are shown in Table 1, and the values of various items and variable distances between surfaces are shown in Table 2. In Table 1, ith (i=1, 2, 3, . . . ) surface numbers that sequentially increase from the magnification side to the reduction side, with the surface toward the magnification side of the constituted element provided at the most magnification side designated as first, are shown in the column Si. The radii of curvature of ith surfaces are shown in the column Ri, the distances between an ith surface and an i+1st surface along the optical axis Z are shown in the column Di. Note that the signs of the radii of curvature are positive in cases that the surface shape is convex toward the magnification side, and negative in cases that the surface shape is convex toward the reduction side. The value in the lowermost row of the column Di is the distance between the optical member 2 and the image display surface 1.

The refractive indices of jth (j=1, 2, 3, . . . ) constituent elements that sequentially increase from the magnification side to the reduction side, with the constituent element at the most magnification side designated as first, with respect to the d line (wavelength: 587.6 nm) are shown in the column Ndj. The Abbe's numbers of jth constituent elements with respect to the d line are shown in the column vdj. Note that Table 1 also shows data related to the optical member 2. In addition, the variable distances between surfaces are represented by the notation "DD [ ]" in Table 1. The surface number toward the magnification side is shown in the brackets [ ], and written in the column Di.

Table 2 shows the zoom ratio Zr, the focal length f of the entire lens system, the air converted distance Bf from the lens surface most toward the reduction side to the reduction side conjugate plane, the F number FNo., the maximum full angle of view 2ω, and the values of variable distances among surfaces, with the d line as a reference. Bf is the back focus as an air converted distance. The notation "[°]" in the row 2w indicates that the units are in degrees. Table 2 shows data in a state at the wide angle end, a state at a first intermediate focal point distance, a state at a second intermediate focal point distance, and a state at the telephoto end in columns labeled Wide Angle, Intermediate 1, Intermediate 2, and Telephoto, respectively. The values of the variable distances among surfaces in Table 1 and Table 2 are those for cases in which the projection distance is 2000. The values shown in Table 2 other than the variable distances among surfaces are those for cases in which the projection distance is infinity. Note that numerical values which are rounded off at a predetermined number of digits are shown in each of the tables below.

TABLE 1

Example 1

| Si | Ri | Di | Ndj | vdj |
|---|---|---|---|---|
| 1 | 52.377 | 8.997 | 1.61340 | 44.27 |
| 2 | 121.675 | 0.150 | | |
| 3 | 36.548 | 1.959 | 1.77250 | 49.60 |
| 4 | 22.301 | 6.323 | | |
| 5 | 43.720 | 1.658 | 1.77250 | 49.60 |
| 6 | 20.552 | 7.318 | | |
| 7 | −524.574 | 1.394 | 1.90366 | 31.31 |
| 8 | 22.776 | 8.509 | | |
| 9 | 35.841 | 1.507 | 1.84666 | 23.78 |
| 10 | 22.834 | 12.669 | 1.61340 | 44.27 |
| 11 | −38.323 | 1.492 | | |
| 12 | 202.512 | 1.356 | 1.80400 | 46.58 |
| 13 | 42.301 | 6.956 | | |
| 14 | −179.999 | 6.090 | 1.51742 | 52.43 |
| 15 | −24.344 | 0.151 | | |
| 16 | −38.955 | 1.206 | 1.61272 | 58.72 |
| 17 | 54.193 | DD [17] | | |
| 18 | −260.474 | 1.206 | 1.61800 | 63.33 |
| 19 | 29.757 | 6.193 | 1.58144 | 40.75 |
| 20 | −60.480 | 8.747 | | |
| 21 | 44.390 | 2.968 | 1.62004 | 36.26 |
| 22 | 323.158 | DD [22] | | |
| 23 | 74.215 | 2.169 | 1.48749 | 70.24 |
| 24 | −165.892 | DD [24] | | |
| 25 | −93.815 | 0.840 | 1.83481 | 42.72 |
| 26 | 16.996 | 0.008 | | |
| 27 | 17.059 | 7.992 | 1.52249 | 59.83 |
| 28 | −11.860 | 0.074 | | |
| 29 | −11.735 | 1.884 | 1.80400 | 46.58 |
| 30 | 88.604 | 5.036 | 1.49700 | 81.54 |
| 31 | −26.323 | 1.911 | | |
| 32 | 936.384 | 6.781 | 1.49700 | 81.54 |
| 33 | −20.946 | DD [33] | | |
| 34 | 83.725 | 3.286 | 1.48749 | 70.24 |
| 35 | −136.141 | 10.000 | | |
| 36 | ∞ | 52.000 | 1.51633 | 64.14 |
| 37 | ∞ | 3.000 | 1.50847 | 61.19 |
| 38 | ∞ | 3.617 | | |

TABLE 2

Example 1

| | Wide Angle | Intermediate 1 | Intermediate 2 | Telephoto |
|---|---|---|---|---|
| Zr | 1.0 | 1.15 | 1.3 | 1.5 |
| f | 10.0 | 11.5 | 13.0 | 15.0 |

TABLE 2-continued

Example 1

| | Wide Angle | Intermediate 1 | Intermediate 2 | Telephoto |
|---|---|---|---|---|
| Bf | 49.9 | 49.9 | 49.9 | 49.9 |
| FNo. | 2.51 | 2.58 | 2.66 | 2.83 |
| 2ω [°] | 81.6 | 73.8 | 67.0 | 59.6 |
| DD [17] | 18.708 | 12.206 | 7.641 | 3.472 |
| DD [22] | 41.350 | 35.194 | 28.048 | 17.947 |
| DD [24] | 1.507 | 9.935 | 17.689 | 26.386 |
| DD [33] | 0.377 | 4.608 | 8.564 | 14.136 |

FIG. 7 is a collection of diagrams that illustrate the aberrations of the projection zoom lens of Example 1. In FIG. 7, diagrams that illustrate aberrations at the wide angle end in the case that the projection distance is 8000 are shown in the top row, diagrams that illustrate aberrations at the wide angle end in the case that the projection distance is 2000 are shown in the second row from the top, diagrams that illustrate aberrations at the telephoto angle end in the case that the projection distance is 8000 are shown in the third row from the top, and diagrams that illustrate aberrations at the telephoto angle end in the case that the projection distance is 2000 are shown in the bottom row. In addition, the diagrams illustrate spherical aberration, astigmatism, distortion, and lateral chromatic aberration (chromatic aberration of magnification) from the left to the right. In the diagrams that illustrate spherical aberration, aberrations related to the d line (wavelength: 587.6 nm), the C line (wavelength: 656.3 nm), and the F line (wavelength: 486.1 nm) are indicated by a black solid line, a long broken line, and a short broken line, respectively. In the diagrams that illustrate astigmatism, aberrations related to the d line in the sagittal direction and the tangential direction are indicated by a solid line and a broken line, respectively, which are denoted with the letters (S) and (T). In the diagrams that illustrate distortion, aberration related to the d line is indicated by a solid line. In the diagrams that illustrate lateral chromatic aberration, aberrations related to the C line and the F line are indicated by a long broken line and a short broken line, respectively. In the diagrams that illustrate spherical aberration, "FNo." denotes F numbers, and in the diagrams that illustrate other aberrations, "ω" denotes half angles of view.

The symbols, the meanings, and the manners in which the various pieces of data are described in the description of Example 1 above are the same for the examples to be described below unless otherwise noted. Therefore, redundant portions will be omitted from the following descriptions of the other examples.

Example 2

Figure 5:
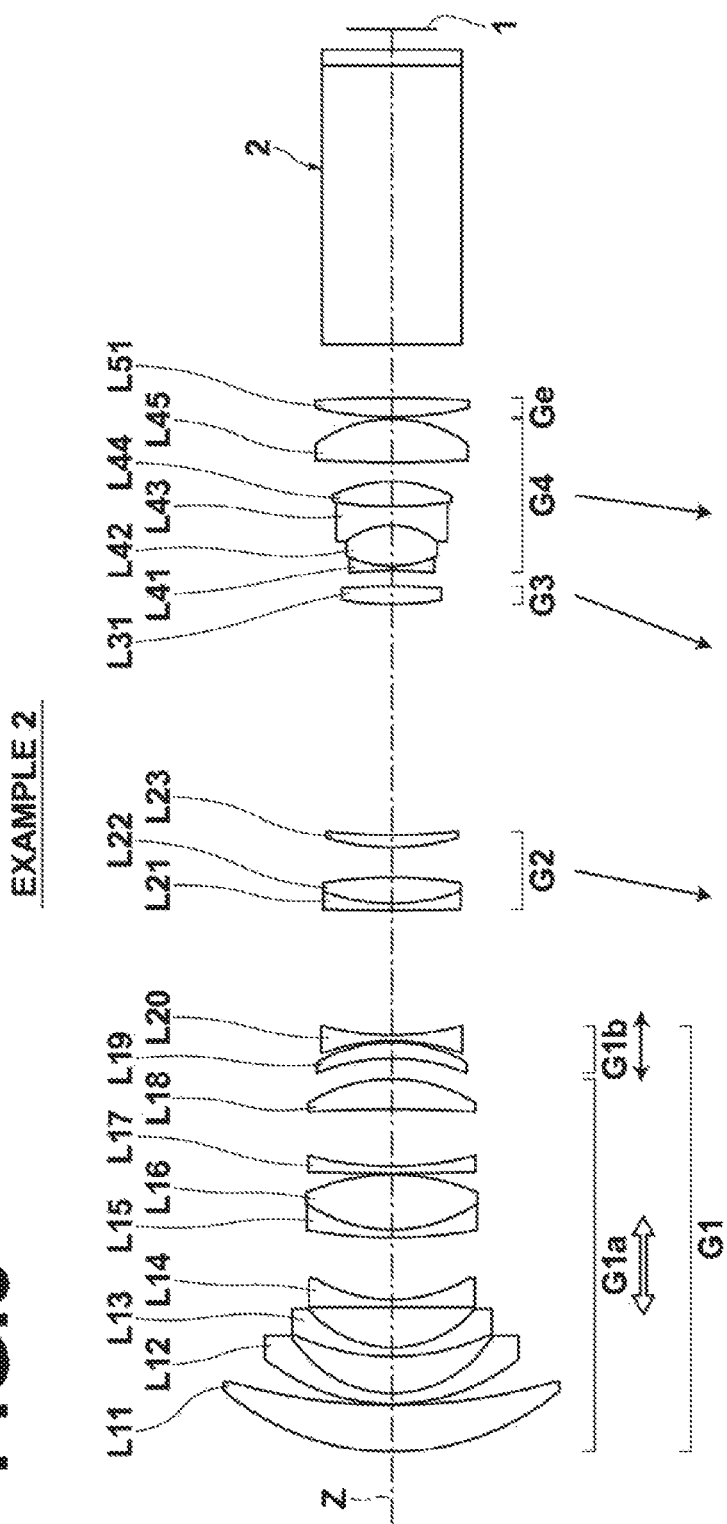
FIG. 5 is a sectional diagram that illustrates the lens configuration of a projection zoom lens according to Example 2 of the present disclosure.

FIG. 5 is a sectional diagram that illustrates the lens configuration of a projection zoom lens of Example 2. The projection zoom lens of Example 2 is constituted by five lens groups, which are a first lens group G1 through a fourth lens group G4, the distances among adjacent lens groups therein changing when changing magnification from the wide angle end to the telephoto end, and a final lens group Ge. Only a second lens group G2 through the fourth lens group G4 move while the first lens group G1 and the final lens group Ge are fixed, when changing magnification.

The first lens group G1 is constituted by, in order from the magnification side to the reduction side, a front group G1a having a negative refractive power, and a rear group G1b having a negative refractive power. Only the rear group G1b moves during focusing operations. The projection zoom lens of Example 2 is configured such that field curvature is corrected by moving the front group G1a in the direction of the optical axis. The front group G1a is constituted by, in order from the magnification side to the reduction side, a positive lens L11 with a convex surface toward the magnification side, three negative lenses L12 through L14 with concave surfaces toward the reduction side, a negative meniscus lens L15 with a concave surface toward the reduction side, a biconvex lens L16, a negative meniscus lens L17 with a concave surface toward the reduction side, and a positive meniscus lens L18 with a convex surface toward the reduction side. The lens L15 and the lens L16 are cemented together. The rear group G1b is constituted by, from the magnification side to the reduction side, a positive meniscus lens L19 with a convex surface toward the reduction side and a biconcave lens L20. All of the lenses that constitute the rear group G1b are single lenses.

The second lens group G2 is constituted by, from the magnification side to the reduction side, a cemented lens formed by a negative lens L21 and a positive lens L22 which are cemented together, and a positive lens L23. The third lens group G3 is constituted only by a positive lens L31 with a convex surface toward the magnification side. The fourth lens group G4 is constituted by, in order from the magnification side to the reduction side, five lenses, which are lenses L41 through L45. The final lens group Ge is constituted only by a biconvex lens L51. Basic lens data of the projection zoom lens of Example 2 are shown in Table 3, and the values of various items and variable distances between surfaces are shown in Table 4. Diagrams that illustrate the aberrations of the projection zoom lens of Example 2 are illustrated in FIG. 8.

TABLE 3

Example 2

| Si | Ri | Di | Ndj | vdj |
|---|---|---|---|---|
| 1 | 51.653 | 8.669 | 1.59551 | 39.24 |
| 2 | 114.132 | 0.227 | | |
| 3 | 39.824 | 1.963 | 1.77250 | 49.60 |
| 4 | 22.847 | 6.922 | | |
| 5 | 45.943 | 1.661 | 1.77250 | 49.60 |
| 6 | 21.397 | 7.533 | | |
| 7 | ∞ | 1.397 | 1.90366 | 31.31 |
| 8 | 29.158 | 11.568 | | |
| 9 | 91.536 | 1.510 | 1.80518 | 25.42 |
| 10 | 29.977 | 10.331 | 1.61340 | 44.27 |
| 11 | −41.596 | 0.192 | | |
| 12 | 560.244 | 1.359 | 1.69680 | 55.53 |
| 13 | 67.172 | 10.576 | | |
| 14 | −268.522 | 5.653 | 1.51742 | 52.43 |
| 15 | −31.314 | 3.765 | | |
| 16 | −40.761 | 3.149 | 1.48749 | 70.24 |
| 17 | −28.809 | 0.234 | | |
| 18 | −40.050 | 1.095 | 1.59282 | 68.62 |
| 19 | 53.556 | DD [19] | | |
| 20 | 610.860 | 1.246 | 1.59282 | 68.62 |
| 21 | 38.795 | 4.879 | 1.57501 | 41.50 |
| 22 | −90.838 | 5.635 | | |
| 23 | 47.803 | 2.278 | 1.67270 | 32.10 |
| 24 | 134.303 | DD [24] | | |
| 25 | 59.352 | 3.301 | 1.48749 | 70.24 |
| 26 | −156.456 | DD [26] | | |
| 27 | −95.323 | 0.831 | 1.83481 | 42.72 |
| 28 | 21.394 | 0.014 | | |
| 29 | 21.526 | 7.570 | 1.48749 | 70.24 |
| 30 | −14.251 | 0.018 | | |
| 31 | −14.195 | 3.471 | 1.80400 | 46.58 |
| 32 | 79.977 | 4.715 | 1.48749 | 70.24 |
| 33 | −27.461 | 3.668 | | |
| 34 | 353.489 | 7.987 | 1.49700 | 81.61 |
| 35 | −25.739 | DD [35] | | |
| 36 | 64.802 | 3.595 | 1.49700 | 81.61 |
| 37 | −209.584 | 10.000 | | |

TABLE 3-continued

Example 2

| Si | Ri | Di | Ndj | vdj |
|---|---|---|---|---|
| 38 | ∞ | 52.000 | 1.51633 | 64.14 |
| 39 | ∞ | 3.000 | 1.50847 | 61.19 |
| 40 | ∞ | 3.740 | | |

TABLE 4

Example 2

| | Wide Angle | Intermediate 1 | Intermediate 2 | Telephoto |
|---|---|---|---|---|
| Zr | 1.0 | 1.15 | 1.3 | 1.5 |
| f | 10.0 | 11.5 | 13.0 | 15.0 |
| Bf | 50.0 | 50.0 | 50.0 | 50.0 |
| FNo. | 2.51 | 2.60 | 2.70 | 3.00 |
| 2ω [°] | 81.6 | 73.8 | 67.2 | 59.8 |
| DD [19] | 23.299 | 15.417 | 9.781 | 4.624 |
| DD [24] | 43.063 | 39.428 | 34.377 | 26.341 |
| DD [26] | 3.020 | 9.326 | 15.526 | 22.691 |
| DD [35] | 0.405 | 5.616 | 10.102 | 16.131 |

Example 3

Figure 6:
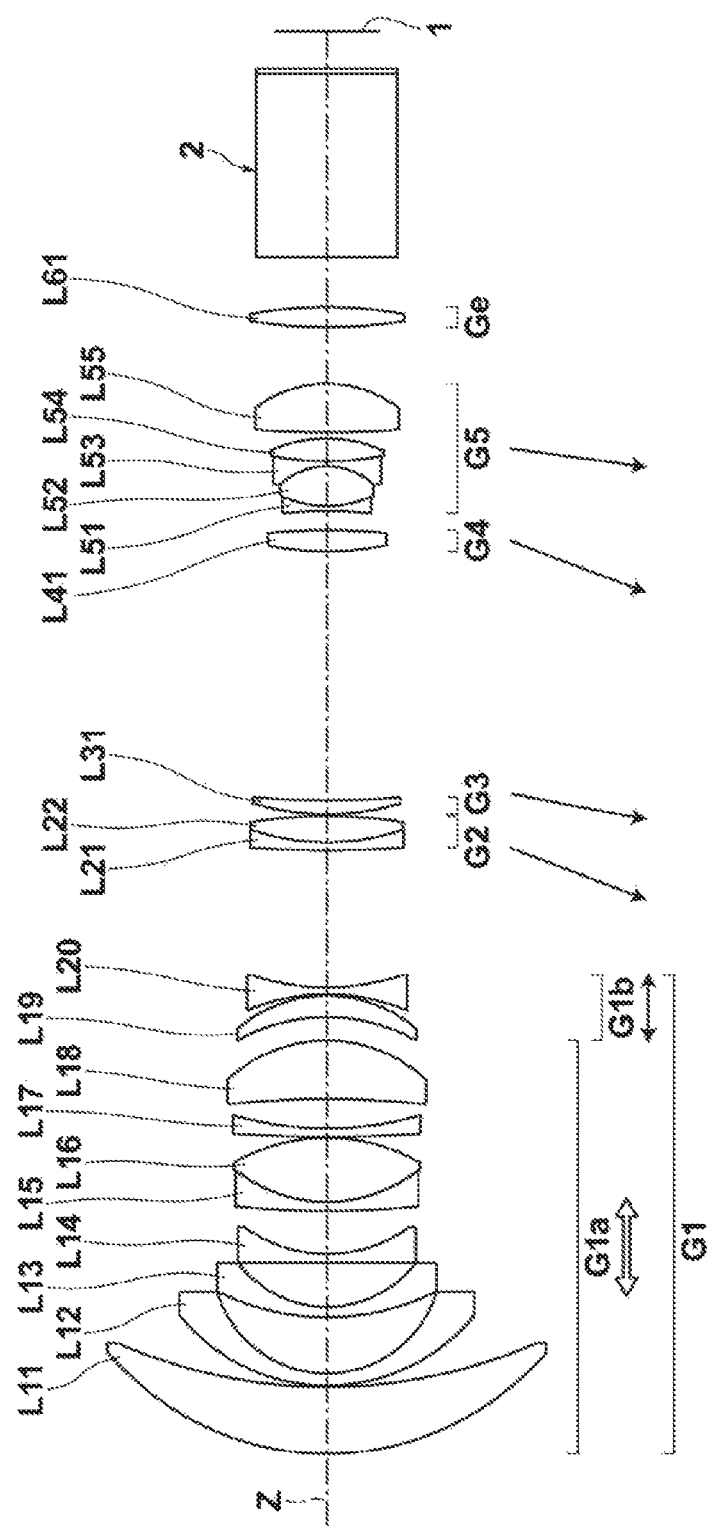
FIG. 6 is a sectional diagram that illustrates the lens configuration of a projection zoom lens according to Example 3 of the present disclosure.

FIG. 6 is a sectional diagram that illustrates the lens configuration of a projection zoom lens of Example 3. The projection zoom lens of Example 3 is constituted by six lens groups, which are a first lens group G1 through a fifth lens group G5, the distances among adjacent lens groups therein changing when changing magnification from the wide angle end to the telephoto end, and a final lens group Ge. Only a second lens group G2 through the fifth lens group G5 move while the first lens group G1 and the final lens group Ge are fixed, when changing magnification.

The first lens group G1 is constituted by, in order from the magnification side to the reduction side, a front group G1a having a negative refractive power, and a rear group G1b having a negative refractive power. Only the rear group G1b moves during focusing operations. The projection zoom lens of Example 3 is configured such that field curvature is corrected by moving the front group G1a in the direction of the optical axis. The front group G1a is constituted by, in order from the magnification side to the reduction side, a positive lens L11 with a convex surface toward the magnification side, three negative lenses L12 through L14 with concave surfaces toward the reduction side, a negative meniscus lens L15 with a concave surface toward the reduction side, a biconvex lens L16, a negative meniscus lens L17 with a concave surface toward the reduction side, and a positive meniscus lens L18 with a convex surface toward the reduction side. The lens L15 and the lens L16 are cemented together. The rear group G1b is constituted by, from the magnification side to the reduction side, a positive meniscus lens L19 with a convex surface toward the reduction side and a biconcave lens L20. All of the lenses that constitute the rear group G1b are single lenses.

The second lens group G2 is constituted by one cemented lens, formed by cementing a negative lens L21 and a positive lens L22, provided in this order from the magnification side to the reduction side, together. The third lens group G3 is constituted only by a positive lens L31 with a convex surface toward the magnification side. The fourth lens group G4 is constituted only by a biconvex lens L41. The fifth lens group G5 is constituted by, in order from the magnification side to the reduction side, five lenses, which are lenses L51 through L55. The final lens group Ge is constituted only by a biconvex lens L61. Basic lens data of the projection zoom lens of Example 3 are shown in Table 5, and the values of various items and variable distances between surfaces are shown in Table 6. Diagrams that illustrate the aberrations of the projection zoom lens of Example 3 are illustrated in FIG. 9.

TABLE 5

Example 3

| Si | Ri | Di | Ndj | vdj |
|---|---|---|---|---|
| 1 | 60.534 | 13.264 | 1.67270 | 32.10 |
| 2 | 109.506 | 0.281 | | |
| 3 | 39.823 | 2.428 | 1.88100 | 40.14 |
| 4 | 23.858 | 11.251 | | |
| 5 | 51.311 | 2.055 | 1.91082 | 35.25 |
| 6 | 23.193 | 8.902 | | |
| 7 | ∞ | 1.728 | 1.90366 | 31.31 |
| 8 | 29.590 | 8.580 | | |
| 9 | 180.738 | 1.868 | 1.80518 | 25.42 |
| 10 | 31.132 | 12.732 | 1.61340 | 44.27 |
| 11 | −39.253 | 0.187 | | |
| 12 | 292.389 | 1.681 | 1.69680 | 55.53 |
| 13 | 71.606 | 5.847 | | |
| 14 | −197.629 | 11.699 | 1.51742 | 52.43 |
| 15 | −30.337 | 4.643 | | |
| 16 | −38.563 | 4.255 | 1.48749 | 70.24 |
| 17 | −28.837 | 0.280 | | |
| 18 | −43.733 | 1.354 | 1.59282 | 68.62 |
| 19 | 50.287 | DD [19] | | |
| 20 | 253.635 | 1.541 | 1.59282 | 68.62 |
| 21 | 50.061 | 5.203 | 1.57501 | 41.50 |
| 22 | −103.255 | DD [22] | | |
| 23 | 54.499 | 2.725 | 1.67270 | 32.10 |
| 24 | 164.330 | DD [24] | | |
| 25 | 62.236 | 4.237 | 1.48749 | 70.24 |
| 26 | −117.493 | DD [26] | | |
| 27 | −123.922 | 1.027 | 1.83481 | 42.72 |
| 28 | 22.714 | 8.086 | 1.48749 | 70.24 |
| 29 | −14.052 | 0.022 | | |
| 30 | −14.089 | 0.933 | 1.80400 | 46.58 |
| 31 | 63.240 | 4.534 | 1.48749 | 70.24 |
| 32 | −29.381 | 1.193 | | |
| 33 | 184.669 | 9.726 | 1.49700 | 81.61 |
| 34 | −24.834 | DD [34] | | |
| 35 | 102.308 | 4.002 | 1.49700 | 81.61 |
| 36 | −89.830 | 10.000 | | |
| 37 | ∞ | 36.500 | 1.51633 | 64.14 |
| 38 | ∞ | 1.000 | 1.50847 | 61.19 |
| 39 | ∞ | 7.486 | | |

TABLE 6

Example 3

| | Wide Angle | Intermediate 1 | Intermediate 2 | Telephoto |
|---|---|---|---|---|
| Zr | 1.0 | 1.15 | 1.3 | 1.5 |
| f | 10.0 | 11.5 | 13.0 | 15.0 |
| Bf | 42.2 | 42.2 | 42.2 | 42.2 |
| FNo. | 2.49 | 2.68 | 2.88 | 3.19 |
| 2ω [°] | 93.6 | 85.6 | 78.6 | 70.6 |
| DD [19] | 27.475 | 18.461 | 12.076 | 5.609 |
| DD [22] | 0.467 | 2.527 | 3.754 | 6.270 |
| DD [24] | 49.683 | 45.429 | 40.376 | 31.500 |
| DD [26] | 3.736 | 11.297 | 18.404 | 26.866 |
| DD [34] | 11.309 | 14.956 | 18.060 | 22.425 |

The upper portion of Table 7 shows values corresponding to Conditional Formulae (1) through (6) for Examples 1 through 3. Values corresponding to both the left side and the right side are shown with respect to Conditional Formulae (3) and (4). The lower portion of Table 7 shows values related to the conditional formulae for Examples 1 through 3. The values shown in Table 7 are related to the d line.

TABLE 7

| Formula | | Example 1 | Example 2 | Example 3 |
|---|---|---|---|---|
| (1) | |fw/f1a| | 0.129 | 0.007 | 0.025 |
| (2) | h1a/h1b | 2.64 | 2.79 | 3.23 |
| (3) | Ndn | 1.84666 | 1.80518 | 1.80518 |
| (3) | −0.01 · vdn + 2.1 | 1.8622 | 1.8458 | 1.8458 |
| (4) | Ndp | 1.61340 | 1.61340 | 1.61340 |
| (4) | −0.01 · vdp + 2.1 | 1.6573 | 1.6573 | 1.6573 |
| (5) | f1b/f1a | 0.516 | 0.032 | 0.115 |
| (6) | Bf/fw | 4.99 | 5 | 4.22 |

| | Example 1 | Example 2 | Example 3 |
|---|---|---|---|
| f1a | −77.52 | −1458.19 | −406.08 |
| f1b | −40 | −47.22 | −46.64 |
| h1a | 30.33 | 30.88 | 43.41 |
| h1b | 11.51 | 11.05 | 13.46 |
| Bf | 49.9 | 50.0 | 42.2 |
| fw | 10.0 | 10.0 | 10.0 |
| vdn | 23.78 | 25.42 | 25.42 |
| vdp | 44.27 | 44.27 | 44.27 |

As can be understood from the data above, each of the projection zoom lenses of Examples 1 through 3 is configured such that field curvature is corrected by moving the front group G1a in the direction of the optical axis, achieves a wide angle of view with full angles of view within a range from 80° to 95° at the wide angle end, has a back focus of a sufficient length with a back focus ratio within a range of 4 to 5, has extremely low fluctuations in performance caused by changes in projection distance, favorably corrects various aberrations, and realizes high optical performance.

Figure 10:
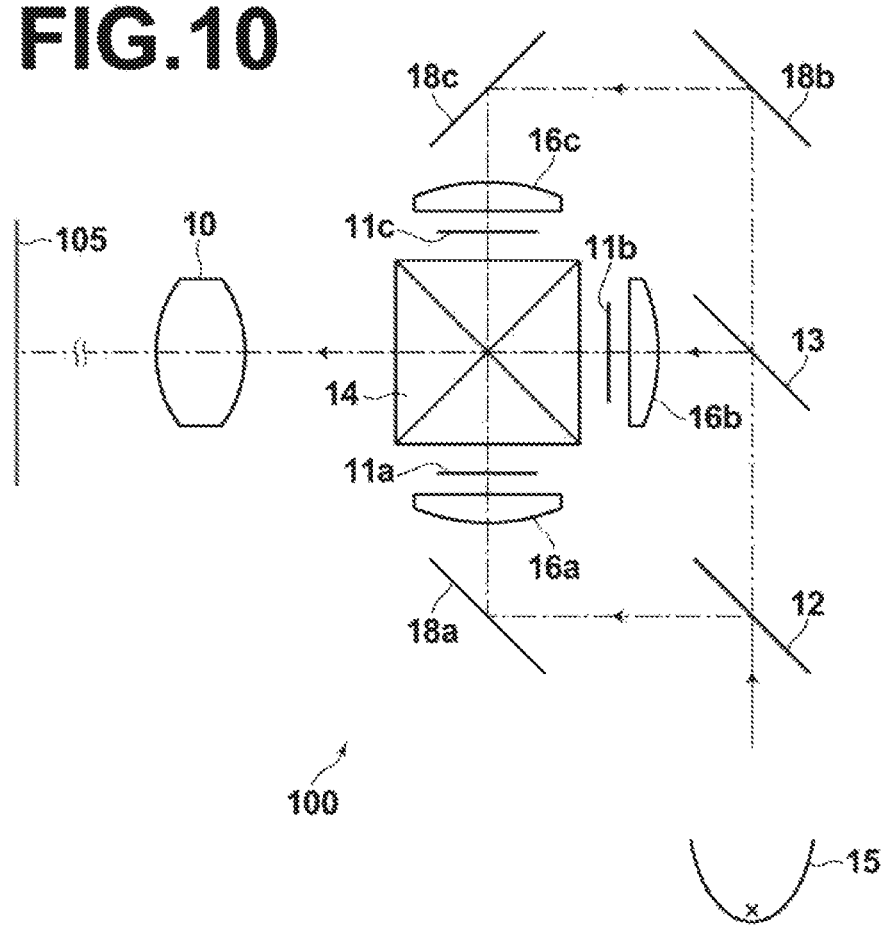
FIG. 10 is a diagram that illustrates the schematic configuration of a projection type display device according to an embodiment of the present disclosure.

Next, embodiments of a projection display device of the present disclosure will be described. FIG. 10 is a diagram that illustrates the schematic configuration of a projection type display device according to an embodiment of the present disclosure. The projection type display device 100 illustrated in FIG. 10 is equipped with: a projection zoom lens 10 according to an embodiment of the present disclosure; a light source 15; transmissive display elements 11a through 11c that function as light valves each corresponding to a colored light beam; dichroic mirrors 12 and 13 for separating colors; a cross dichroic prism 14 for combining colors; condenser lenses 16a through 16c; and total reflection mirrors 18a through 18c for deflecting optical paths. Note that the projection zoom lens 10 is schematically illustrated in FIG. 10. In addition, although not illustrated in FIG. 10, an integrator is provided between the light source 15 and the dichroic mirror 12.

White light output by the light source 15 is separated into three colored light beams (G light, B light, and R light) by the dichroic mirrors 12 and 13. The colored light beams enter the transmissive display elements 11a through 11c corresponding thereto via the condenser lenses 16a through 16c and are optically modulated. After the colors are combined by the cross dichroic prism 14, the combined light beam enters the projection zoom lens 10. The projection zoom lens 10 projects an optical image formed by light which has been optically modulated by the transmissive display elements 11a through 11c onto a screen 105.

Figure 11:
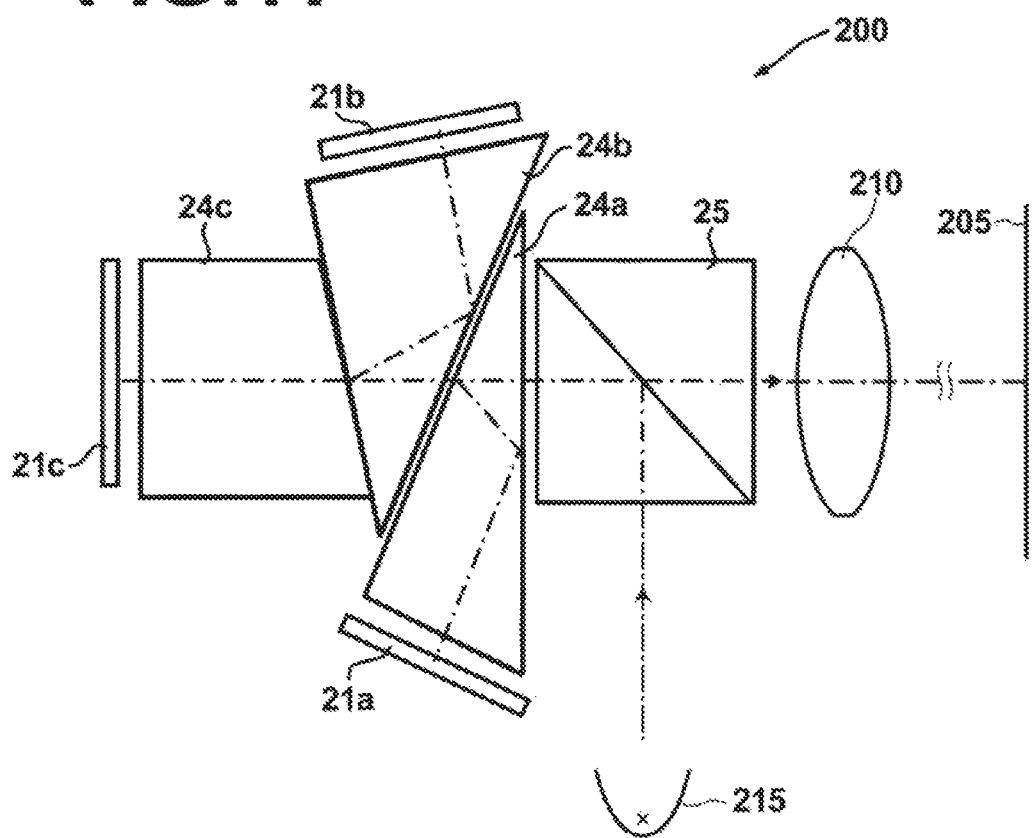
FIG. 11 is a diagram that illustrates the schematic configuration of a projection type display device according to another embodiment of the present disclosure.

FIG. 11 is a diagram that illustrates the schematic configuration of a projection type display device according to another embodiment of the present disclosure. The projection type display device 200 illustrated in FIG. 11 is equipped with: a projection zoom lens 210 according to an embodiment of the present disclosure; a light source 215;

DMD elements 21a through 21c that function as light valves each corresponding to a colored light beam; TIR (Total Internal Reflection) prisms 24a through 24c for separating and combining colors, and a polarization splitting prism 25 that separate illuminating light and projected light. Note that the projection zoom lens 210 is schematically illustrated in FIG. 11. In addition, an integrator is provided between the light source 215 and the polarization splitting prism 25, but is omitted from FIG. 11.

White light output by the light source 215 is reflected by reflective surfaces within the polarization splitting prism 25, and then separated into three colored light beams (G light, B light, and R light) by the TIR prisms 24a through 24c. The colored light beams enter the DMD elements 21a through 21c corresponding thereto, are optically modulated, and then reenter the TIR prisms 24a through 24c in the opposite direction such that the colors are combined. After the colors are combined by the TIR prisms 24a through 24c, the combined light beam enters the projection zoom lens 210 via the polarization splitting prism 25. The projection zoom lens 210 projects an optical image formed by light which has been optically modulated by the DMD elements 21a through 21c onto a screen 205.

Figure 12:
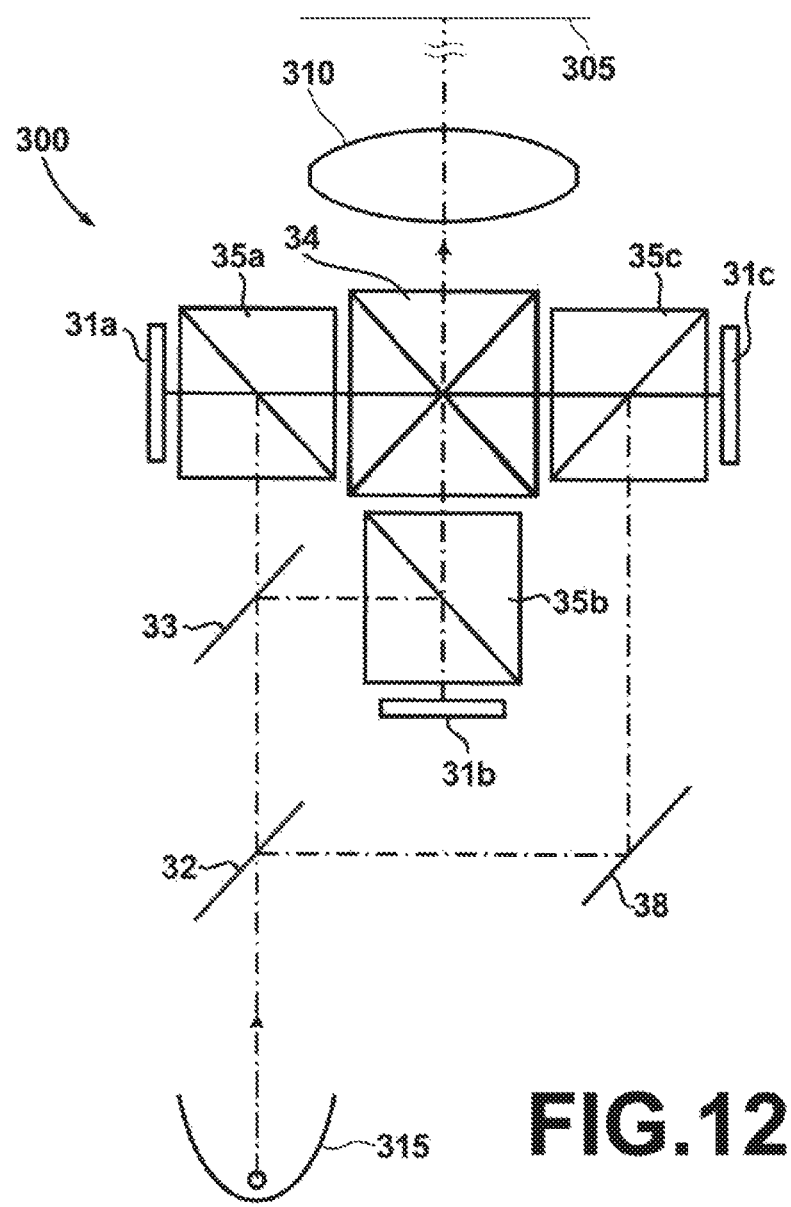
FIG. 12 is a diagram that illustrates the schematic configuration of a projection type display device according to yet another embodiment of the present disclosure.

FIG. 12 is a diagram that illustrates the schematic configuration of a projection type display device according to yet another embodiment of the present disclosure. The projection type display device 300 illustrated in FIG. 12 is equipped with: a projection zoom lens 310 according to an embodiment of the present disclosure; a light source 315; reflective display elements 31a through 31c that function as light valves each corresponding to a colored light beam; dichroic mirrors 32 and 33 for separating colors; a cross dichroic prism 34 for combining colors; a total reflection mirror 38 for deflecting optical paths; and polarization splitting prisms 35a through 35c. Note that the projection zoom lens 310 is schematically illustrated in FIG. 12. In addition, an integrator is provided between the light source 315 and the dichroic mirror 32, but is omitted from FIG. 12.

White light output by the light source 315 is separated into three colored light beams (G light, B light, and R light) by the dichroic mirrors 32 and 33. The colored light beams enter the reflective display elements 31a through 31c corresponding thereto via the polarization splitting prisms 35a through 35c and are optically modulated. After the colors are combined by the cross dichroic prism 34, the combined light beam enters the projection zoom lens 310. The projection zoom lens 310 projects an optical image formed by light which has been optically modulated by the reflective display elements 31a through 31c onto a screen 305.

Embodiments and Examples of the present disclosure have been described above. However, the projection zoom lens of the present disclosure is not limited to the Examples described above, and various modifications to the aspects of the projection zoom lens are possible. For example, the radii of curvature, the distances among surfaces, the refractive indices, and the Abbe's numbers of the lenses may be changed as appropriate.

Note that the projection zoom lens of the present disclosure is not limited to those in which the front group is constantly in a movable state. Projection zoom lenses in which the front group is moved to correct field curvature, after which the front group is fixed, are included within the technical scope of the present disclosure, as long as the projection zoom lenses satisfy the requirements of the present disclosure.

In addition, the projection type display device of the present disclosure is not limited to that having the configuration described above. For example, the light valves to be employed and the optical members to be employed to separate or combine light beams are not limited to the configurations described above, and various changes to these aspects are possible.

What is claimed is:

1. A projection zoom lens, comprising:
a first lens group having a negative refractive power provided most toward the magnification side, which is fixed when changing magnification; and
at least two movable lens groups that move to change the relative distance therebetween in the direction of an optical axis when changing magnification;
the first lens group consisting of, in order from the magnification side to the reduction side, a front group which is fixed during focusing operations and a rear group having a negative refractive power that moves in the direction of the optical axis during focusing operations;
the front group moving in the direction of the optical axis to correct field curvature; and
Conditional Formula (1) below being satisfied:

$$|fw/fla|<0.2 \tag{1}$$

wherein fw is the focal length of the entire lens system at the wide angle end;
and fla is the focal length of the front group.

2. A projection zoom lens as defined in claim 1, in which Conditional Formula (2) below is satisfied:

$$1.5<hla/hlb \tag{2}$$

wherein hla is the maximum height of a principal light ray at a maximum angle of view at the wide angle end in the front group in the case that the reduction side pupil position is infinity, and hlb is the maximum height of a principal light ray at a maximum angle of view at the wide angle end in the rear group in the case that the reduction side pupil position is infinity.

3. A projection zoom lens as defined in claim 2, in which Conditional Formula (2-1) below is satisfied:

$$2.0<hla/hlb<4.0 \tag{2-1}$$

4. A projection zoom lens as defined in claim 1, wherein:
the lens surface most toward the reduction side within the rear group is a concave surface.

5. A projection zoom lens as defined in claim 1, wherein:
a final lens group having a positive refractive power, which is fixed when changing magnification, is provided most toward the reduction side.

6. A projection zoom lens as defined in claim 1, wherein:
the lens provided most toward the reduction side in the rear group is a negative lens; and
the lens provided second from the reduction side in the rear group is a positive lens.

7. A projection zoom lens as defined in claim 1, wherein:
the front group includes a cemented lens formed by cementing a negative lens and a positive lens together;
the refractive index with respect to the d line of the negative lens that constitutes the cemented lens is greater than the refractive index with respect to the d line of the positive lens that constitutes the cemented lens by at least 0.1; and
Conditional Formulae (3) and (4) below are satisfied:

$$Ndn<-0.01 \cdot vdn+2.1 \tag{3}$$

$$Ndp<-0.01 \cdot vdp+2.1 \tag{4}$$

wherein Ndn is the refractive index with respect to the d line of the negative lens that constitutes the cemented lens within the front group, vdn is the Abbe's number with respect to the d line of the negative lens that constitutes the cemented lens within the front group, Ndp is the refractive index with respect to the d line of the positive lens that constitutes the cemented lens within the front group, and vdp is the Abbe's number with respect to the d line of the positive lens that constitutes the cemented lens within the front group.

8. A projection zoom lens as defined in claim 1, in which Conditional Formula (5) below is satisfied:

$$flb/fla<0.8 \qquad (5)$$

wherein fla is the focal length of the front group, and flb is the focal length of the rear group.

9. A projection zoom lens as defined in claim 8, in which Conditional Formula (5-1) below is satisfied:

$$0.0<flb/fla<0.6 \qquad (5\text{-}1).$$

10. A projection zoom lens as defined in claim 1, consisting of, in order from the magnification side to the reduction side:
   the first lens group;
   three movable lens groups; and
   a final lens group having a positive refractive power which is fixed when changing magnification.

11. A projection zoom lens as defined in claim 1, consisting of, in order from the magnification side to the reduction side:
   the first lens group;
   four movable lens groups; and
   a final lens group having a positive refractive power which is fixed when changing magnification.

12. A projection zoom lens as defined in claim 1, in which Conditional Formula (6) below is satisfied:

$$2.5<Bf/fw \qquad (6)$$

wherein Bf is an air converted distance along the optical axis from the lens surface most toward the reduction side to a reduction side conjugate plane, and fw is the focal length of the entire lens system at the wide angle end.

13. A projection zoom lens as defined in claim 10, in which Conditional Formula (6-1) below is satisfied:

$$3.5<Bf/fw<10.0 \qquad (6\text{-}1).$$

14. A projection zoom lens as defined in claim 1, in which Conditional Formula (1-1) below is satisfied:

$$|fw/fla|<0.15 \qquad (1\text{-}1).$$

15. A projection type display device of the present disclosure comprises:
   a light source;
   a light valve into which light from the light source enters; and
   a projection zoom lens as defined in claim 1 as a projection zoom lens that projects an optical image formed by light, which is optically modulated by the light valve, onto a screen.

* * * * *